United States Patent
Imoehl

[11] Patent Number: 5,105,787
[45] Date of Patent: Apr. 21, 1992

[54] INTERNAL COMBUSTION ENGINE FUEL RAIL ASSEMBLY JOINT

[75] Inventor: William J. Imoehl, Williamsburg, Va.

[73] Assignee: Siemens Automotive L.P., Auburn Hills, Mich.

[21] Appl. No.: 740,563

[22] Filed: Aug. 5, 1991

[51] Int. Cl.$^5$ ............................................. F02M 55/02
[52] U.S. Cl. ................................. 123/469; 123/456; 285/321; 285/382; 285/174
[58] Field of Search ............ 123/456, 468, 469, 470, 123/472; 285/382, 321, 174, 423, 238

[56] References Cited

U.S. PATENT DOCUMENTS

| | | | |
|---|---|---|---|
| 3,726,547 | 4/1973 | Cox, Jr. ......................... | 285/174 |
| 3,858,914 | 1/1975 | Karie et al. .................... | 285/174 |
| 4,093,280 | 6/1978 | Yoshizawa et al. ............. | 285/238 |
| 4,510,909 | 4/1985 | Elphick et al. ................. | 123/469 |
| 4,586,477 | 5/1986 | Field et al. ..................... | 123/468 |
| 4,691,944 | 9/1987 | Viall, Jr. ........................ | 285/321 |
| 4,750,765 | 6/1988 | Cassidy et al. ................. | 285/321 |
| 4,753,459 | 6/1988 | Potier ............................. | 285/238 |
| 4,768,587 | 9/1988 | Halder ............................ | 285/321 |
| 4,800,925 | 1/1989 | Yeoman ......................... | 285/321 |
| 5,002,030 | 3/1991 | Mahnke ......................... | 123/468 |

Primary Examiner—E. Rollins Cross
Assistant Examiner—Thomas N. Moulis
Attorney, Agent, or Firm—George L. Boller; Russel C. Wells

[57] ABSTRACT

A metal tube, such as an inlet, outlet, return, or crossover tube, is connected to a non-metallic fuel rail by means of a tubular sleeve that has one axial end embedded in the fuel rail coaxial with the hole with which the tube is in communication and its other axial end non-embedded. Non-metallic fuel rail material lines the interior of the sleeve from the innermost point of its embedded end to a point that stops short of the outermost point of its non-embedded end. The tube is sealed to this liner, and is prevented from coming out by a retainer, such as a crimp, retention ring or snap ring, that extends radially from the sleeve to overlap a flange that extends around the outside of the tube. The sleeve constitutes an insert onto which the fuel rail is molded during the process of fabricating the fuel rail. A plug of the mold closes off the outer end of the sleeve during molding.

20 Claims, 1 Drawing Sheet

INTERNAL COMBUSTION ENGINE FUEL RAIL ASSEMBLY JOINT

FIELD OF THE INVENTION

This invention relates generally to fuel rail assemblies that are used in the fuel injection systems of automotive internal combustion engines, and specifically to a new and improved joint by which a metal tube and a non-metallic fuel rail are assembled.

BACKGROUND AND SUMMARY OF THE INVENTION

A typical fuel rail assembly comprises a fuel rail that is securely mounted on the engine to span the engine cylinders and that contains devices that are part of a fuel injection system, such as a pressure regulator and electrically operated fuel injectors. The state of the art has progressed to the point where the fuel rails can be made of a non-metallic material, such as a composite, or plastic. However, metal tubes, typically steel, are still used as inlet and outlet tubes to convey fuel to and from the fuel rail, and also as cross-over tubes between plastic fuel rails that connect opposite cylinder banks in a V-type engine. Each metal tube is connected to the non-metallic fuel rail by means of a joint.

The use of metal tubes for connection to a non-metallic fuel rail is considered to enhance the crashworthiness of a fuel rail assembly in the event of an accident because of the physical characteristics of metal tubing. Ideally, the joint that connects each metal tube to the fuel rail should be equally crashworthy. It should provide a seal that will remain in tact during normal use and during certain crashes to which the automotive vehicle may be subjected. It should also be compatible with mass-production assembly processing techniques.

One known joint for connecting a metal tube to a non-metallic fuel rail comprises a cylindrical metal insert that is disposed at the outer end of a hole in the fuel rail. Assembly of the insert to the fuel rail is accomplished by conventional insert molding techniques. The metal tube that is to be assembled to the fuel rail is inserted into this cylindrical metal insert, and the free distal end of the insert is crimped over a flange on the tube to prevent the tube from coming out of the insert. An O-ring seal between the tube and the insert provides the fluid seal between the two. The O.D. of the insert must itself be sealed to the fuel rail hole, and this is accomplished either by a labyrinth seal or another O-ring. This known joint possesses excellent tube retention, tamper-proofness, and crashworthiness. Unfortunately, the fact that the sealing of the insert's O.D. to the fuel rail hole is not conducive to mass-production fabrication presents a barrier to mass-production fabrication of the joint.

Another known joint for connecting a metal tube to a non-metallic fuel rail comprises an integral circular flange on the fuel rail that surrounds the entrance of the fuel rail hole to which the metal tube is to be joined. The metal tube is inserted directly into that hole, and an O-ring seal between the tube and the hole provides the fluid seal between the two. The radially outer margin of a crimp ring is crimped over the circular fuel rail flange, and the radially inner margin of the crimp ring radially overlaps a flange on the tube to prevent the tube from coming out of the fuel rail hole. While this known joint possesses suitable tube retention, tamper-proofness, and crashworthiness, it too poses a barrier to mass-production processes. This is because the crimping of the crimp ring to the circular fuel rail flange is not conducive to mass-production fabrication and quality control techniques when the fuel rails are fabricated from more brittle non-metallic materials, such as thermoset plastic.

The present invention relates to a new and improved joint for connecting a metal tube to a non-metallic fuel rail which does not pose barriers to mass-production fabrication techniques, such as those that have just been described in the case of the two known joints. Like the first known joint described above, the joint of the present invention retains the advantage of allowing a metallic insert to be insert-molded into the non-metallic fuel rail, but without the level of concern that is necessary for assuring that a fluid-tight seal is provided between the two. This is because the insert-molding step of the present invention inherently creates a satisfactory seal by virtue of the unique construction that results from the unique manner of insert-molding. Like the second known joint described above, the joint of the present invention retains the advantage of allowing the metal tube to seal to a plastic part. The present invention also retains the advantage of allowing the crimp ring to crimped onto metal, as in the first known joint, rather than plastic, as in the second known joint.

The foregoing, along with additional features, advantages, and benefits of the invention, will be seen in the ensuing description and claims which are accompanied by a drawing. The drawing discloses a presently preferred embodiment according to the best mode contemplated at the present time for carrying out the invention.

DESCRIPTION OF THE PREFERRED EMBODIMENT

Figure 1:
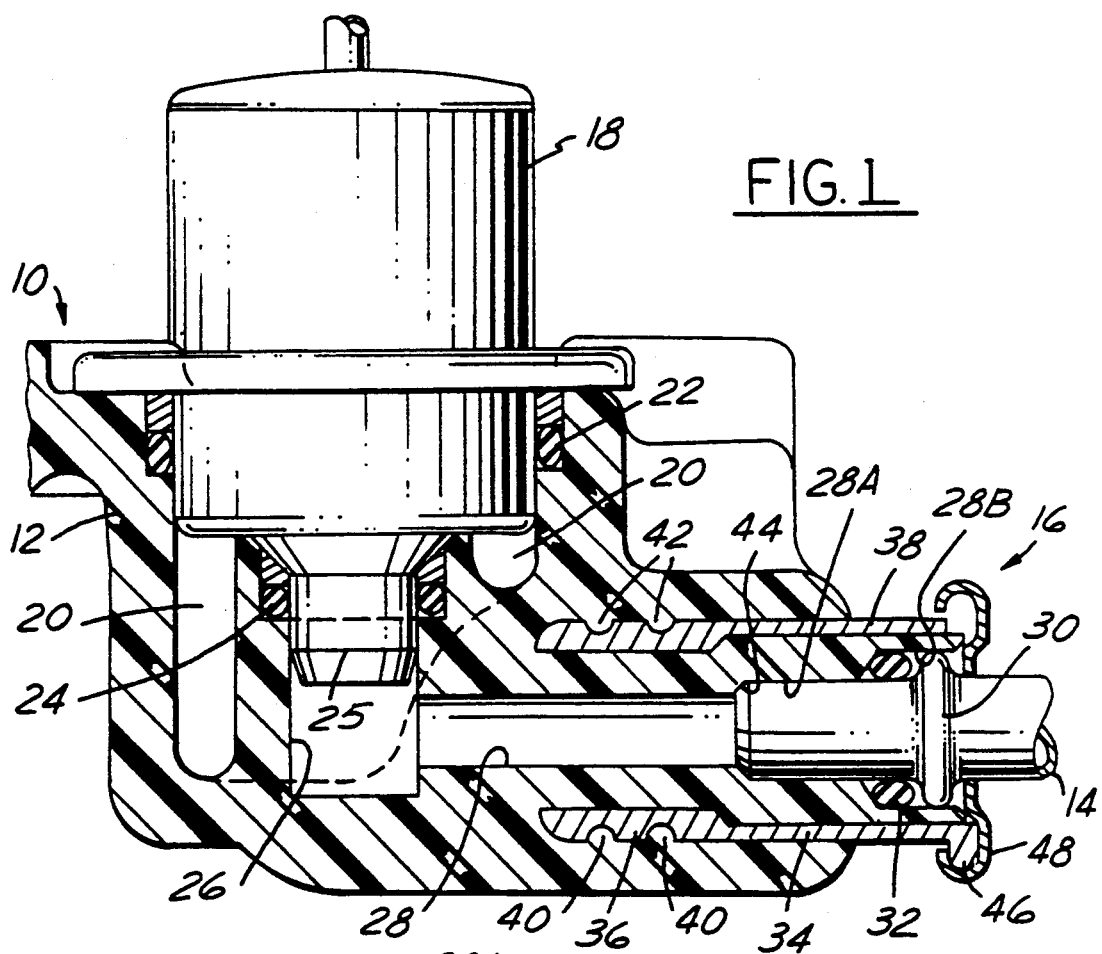
FIG. 1 is a longitudinal cross sectional view through a portion of a fuel rail assembly embodying the present invention.

FIG. 1 shows a portion of a fuel rail assembly 10 that illustrates principles of the invention and comprises a non-metallic fuel rail 12 and a metal tube 14 (preferably steel) that are connected together at a joint 16. The portion of fuel rail assembly 10 that is illustrated in the drawing is in the vicinity of a fuel pressure regulator 18, typically near one lengthwise end of fuel rail 12. The fuel rail comprises a main longitudinal passage that runs perpendicular to the plane of FIG. 1 and that is in fluid communication with an annular well 20 that is ensealed by spaced apart O-rings 22, 24 between wall portions of the well and the outside of pressure regulator 18. Electrically operated fuel injectors (not shown) are received in sockets (not shown) of the fuel rail that transversely intersect said passage at spaced apart locations along its length. Liquid fuel in well 20 is communicated to the inlet of pressure regulator 18, and the pressure regulator's outlet 25 is communicated to a vertical hole 26 that is radially intercepted by a hole 28 leading to tube 14. Thus as those skilled in the art can appreciate, tube 14 is a return tube that serves to convey excess fuel from fuel rail 12 back to a fuel tank (not shown).

Tube 14 is telescoped into the outer end of hole 28, and the outer end portion of hole 28 is constructed with two counterbores 28a and 28b for acceptance of tube 14. The smaller diameter counterbore 28a which is immediately contiguous the nominal diameter portion of hole 28 closely receives the distal end portion of tube 14. Proximally of this distal end portion, tube 14 comprises an integral circular flange 30 extending around the outside of the tube. Flange 30 is disposed within counterbore 28b. An O-ring seal 32 is disposed around the outside of tube 14 distally of flange 30 to seal between tube 14 and counterbore 28b.

Joint 16 further includes a cylindrical metal sleeve 34 that is coaxial with the common axis of hole 28 and its counterbores 28a, 28b. One axial end portion 36 of sleeve 34 is embedded in non-metallic fuel rail 12 while an opposite axial end portion 38 of the sleeve is not. Sleeve 34 is united with fuel rail 12 during the process of fabricating the fuel rail. Specifically, the sleeve is insert-molded into the fuel rail, i.e., the sleeve forms an insert onto which the non-metallic fuel rail 12 is molded in the manner illustrated.

Axial end portion 36 has two axially spaced apart circular grooves 40 extending around its O.D. These grooves provide for the non-metallic material of fuel rail 12 to create radial formations 42 that extend radially inwardly from the cylindrical outer portion of non-metallic material of fuel rail 12 which circumferentially confines sleeve 34 and that interlock sleeve 34 and fuel rail 12 together so as to resist any attempted shifting of the sleeve on the fuel rail in either axial direction. The I.D. of sleeve 34 comprises a shoulder 44 that separates a thicker-walled portion of the sleeve from a thinner-walled portion. As a result, that portion of fuel rail 12 which forms a cylindrical liner lining the interior of sleeve 34 comprises another axial interlock that coincidentally functions to resist attempted outward shifting of the sleeve on the fuel rail, although that is not its primary purpose.

The distal end of axial portion 38 comprises a circumferentially continuous circular flange 46. The drawing shows a radiused edge for the flange, but it could have a different shape if desired. A circular annular ring 48 coacts with flange 46 and flange 30 to retain tube 14 in sealed relation with fuel rail 12. The outer margin of ring 48 is securely axially constrained on sleeve 34 by being crimped around and behind flange 46. The radially inner margin of ring 48 radially overlaps flange 30 so as to create an interference which resists separation of tube 14 from fuel rail 12 and therefore keeps the tube sealed to the fuel rail.

It is to be observed that the interior of sleeve 34 is lined with non-metallic fuel rail material less than its full axial length such that a short distal end segment of the sleeve is unlined. This occurs because of a plug in the mold in which the fuel rail is insert-molded onto the sleeve. That plug serves to close off the distal end segment of the sleeve during the formation of the non-metallic fuel rail material onto the sleeve.

Figure 2:
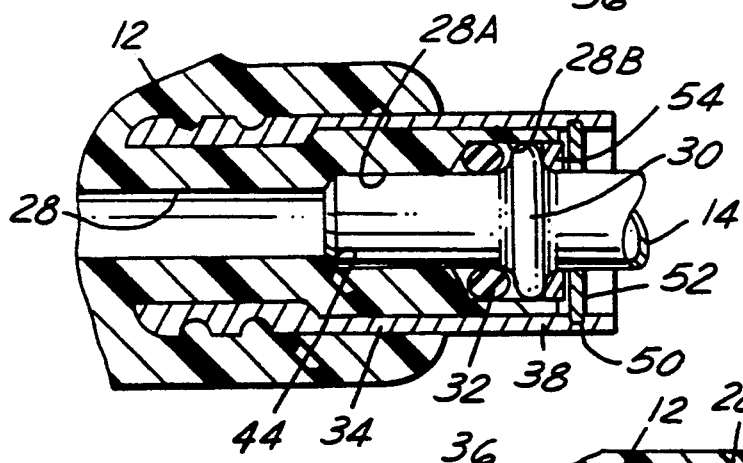
FIG. 2 is a longitudinal cross sectional view embodying a modified form.

FIG. 2 illustrates a modified form in which like numerals are used to designate the corresponding parts that appear in FIG. 1. FIG. 2 differs from FIG. 1 in that sleeve 34 comprises no flange 46 nor retention ring 48. Rather, sleeve 34 comprises a circumferentially continuous groove 50 extending around its I.D. just inside of the distal end of the non-embedded axial portion 38. The radially outer margin of a circular snap ring retainer 52 is disposed in groove 50 and the radially inner margin radially overlaps flange 30. Here too, the interior of sleeve 34 is lined with non-metallic fuel rail material less than its full axial length such that a short distal end segment of the sleeve is unlined. In this embodiment, it is essential that the non-metallic fuel rail material not intrude over or into groove 50 during the molding process. The mold plug is shaped for suitable mating engagement with the sleeve such that such undesired overmolding does not occur. To keep the integrity of the seal by limiting the extent of possible axial play of tube 14 on fuel rail 12 in the completed joint, a spacer 54 may be disposed between retainer 52 and flange 30 in the manner shown.

Figure 3:
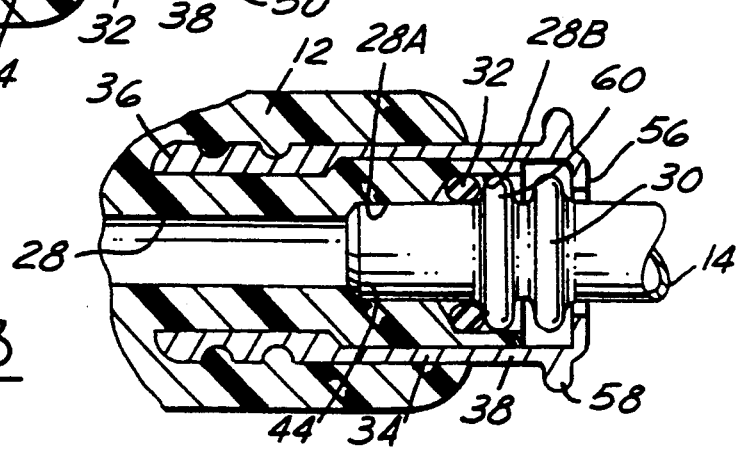
FIG. 3 is a longitudinal cross sectional view embodying another modified form.

FIG. 3 illustrates another modified form in which like numerals are used to designate the corresponding parts that appear in FIG. 1. FIG. 3 differs from FIG. 1 in that no separate retention ring is used. Rather, the distal end of the non-embedded axial portion 38 of sleeve 34 is crimped, after tube 14 has been inserted into fuel rail 12, to create an integral radially inwardly directed flange 56 extending circumferentially around sleeve 34 in interference with flange 30 to keep the tube assembled and sealed to fuel rail 12. In this embodiment too, the interior of sleeve 34 is lined with non-metallic fuel rail material less than its full axial length such that a short distal end segment of the sleeve remains unlined. The mold plug is shaped for suitable mating engagement with the sleeve to create this result. This enables the crimping operation to be conducted without subjecting the lining material to undesired consequences. Because this distal end segment of the sleeve is unlined, suitably shaped crimping apparatus (not shown) can be cooperatively associated with the sleeve end, including a flange 58 extending around the outside of the sleeve, to deform the initially straight tube end into flange 56. To limit the extent of possible axial play of tube 14 on fuel rail 12 in the completed joint, and so that the tube does not lose sealed relation with hole 28, a second integral flange 60 is provided in tube 14 in the manner shown. Alternatively, a separate axial spacer could be used instead of providing the second integral flange in the tube.

In all three embodiments, sleeves 34 are machined parts, preferably steel. In effect, the embedded portion of each sleeve forms a liner for the I.D. of a surrounding cylindrical portion of non-metallic material of fuel rail 12 while other material of fuel rail 12 forms a liner for the I.D. of the sleeve, the latter liner extending further axially outwardly from the fuel rail than does the non-metallic fuel rail material surrounding the outside of the metal sleeve and the end of said latter liner being chamfered. In each completed joint, it is preferred that the extent to which the tube is axially confined be such that the tube can rotate about its own axis relative to the fuel rail for the purpose of facilitating installation on an internal combustion engine.

While a presently preferred embodiment of the invention has been illustrated and described, it should be appreciated that principles are applicable to other embodiments.

What is claimed is:

1. A fuel rail assembly of an internal combustion engine comprising a non-metallic fuel rail containing devices that are part of a fuel injection system of the engine, and also comprising a metal tube which is in fluid communication with a fuel passage in the non-metallic fuel rail and connected with said non-metallic fuel rail by means of a joint, characterized in that said joint comprises a cylindrical metal sleeve that is partially embedded in said non-metallic fuel rail such that a first cylindrical portion of said non-metallic fuel rail lines an interior end portion of said sleeve and is in fluid communication with said fuel passage in said non-metallic fuel rail and such that said sleeve lines the interior of a second cylindrical portion of said non-metallic fuel rail, said metal tube and said first cylindrical portion of said non-metallic fuel rail fit together in a sealed manner to place said metal tube in fluid communication with said fuel passage in said non-metallic fuel rail, said sleeve has another portion that is not embedded in said non-metallic fuel rail, and a retention means coacts with said another axial end segment and with said metal tube to retain said metal tube and said first cylindrical portion of said non-metallic fuel rail fit together in a sealed manner.

2. A fuel rail assembly as set forth in claim 1 characterized further in that said metal tube and said first cylindrical portion of said non-metallic fuel rail fit together in a sealed manner by means of telescoping, one within the other, and an annular sealing means is provided between them.

3. A fuel rail assembly as set forth in claim 2 characterized further in that said metal tube telescopes within said first cylindrical portion of said non-metallic fuel rail.

4. A fuel rail assembly as set forth in claim 3 characterized further in that said first cylindrical portion of said non-metallic fuel rail comprises a circular bore having counterbore means that receives said metal tube and said annular sealing means.

5. A fuel rail assembly as set forth in claim 4 characterized further in that said counterbore means comprises a first counterbore that closely receives a distal end portion of said metal tube, and a second counterbore, larger than said first counterbore, that receives both said annular sealing means and a circular flange on said metal tube that is spaced proximally of both said distal end portion and said annular sealing means, and said retention means coacts with said flange to retain said metal tube and said first cylindrical portion of said non-metallic fuel rail fit together in a sealed manner.

6. A fuel rail assembly as set forth in claim 5 characterized further in that said retention means comprises a circular annular ring that has its radially outer margin axially constrained on said another axial end segment of said sleeve and its radially inner margin radially overlapping said flange.

7. A fuel rail assembly as set forth in claim 6 characterized further in that said another axial end segment of said sleeve has a circular flange extending around the outside of its distal end, and said radially outer margin of said circular annular ring is axially constrained on said another axial end segment of said sleeve by means of a crimp that crimps onto said last-mentioned flange.

8. A fuel rail assembly as set forth in claim 7 characterized further in that said radially inner margin of said circular annular ring is disposed axially within said sleeve, but axially without said first cylindrical portion of said non-metallic fuel rail.

9. A fuel rail assembly as set forth in claim 6 characterized further in that said another axial end segment of said sleeve has a circular annular groove that faces radially inwardly and said circular annular ring is axially constrained on said another axial end segment of said sleeve by having its radially outer margin disposed within said groove.

10. A fuel rail assembly as set forth in claim 9 characterized further in that an axial spacer ring is disposed axially between the radially inner margin of said first-mentioned ring and said flange.

11. A fuel rail assembly as set forth in claim 10 characterized further in that said axial spacer ring is a separate part that is non-integral with either said first-mentioned ring or said flange.

12. A fuel rail assembly as set forth in claim 5 characterized further in that said retention means comprises a radially inwardly directed flange at the distal end of said another axial end segment of said sleeve that radially overlaps said first-mentioned flange.

13. A fuel rail assembly as set forth in claim 3 characterized further in that said metal tube comprises flange means extending around the outside of said metal tube, and said retention means comprises means that is axially constrained on said another axial end segment of said sleeve and that extends radially inwardly from said sleeve to radially overlap said flange means.

14. A fuel rail assembly as set forth in claim 13 characterized further in that said flange means comprises axially spaced apart flanges that axially space said annular sealing means from the radial overlap of said flange means by said retention means' means.

15. A fuel rail assembly as set forth in claim 13 characterized further in that an annular spacer ring is disposed around the outside of said metal tube between said flange means and said sealing means for axially spacing said sealing means from said flange means.

16. A fuel rail assembly as set forth in claim 1 characterized further in that said one axial end segment of said sleeve comprises one or more radial formations that radially overlap corresponding formations in said non-metallic fuel rail to axially interlock the embedded sleeve in said non-metallic fuel rail.

17. A fuel rail assembly as set forth in claim 16 characterized further in that said radial formations in said one axial end segment of said sleeve comprise one or more grooves extending around the outside of said sleeve.

18. A fuel rail assembly as set forth in claim 17 characterized further in that said grooves are disposed in a nominally thicker wall portion of said sleeve than the remainder of said one axial end segment of said sleeve.

19. A fuel rail assembly as set forth in claim 1 characterized further in that said first cylindrical portion extends further axially outwardly from said non-metallic fuel rail than does said second cylindrical portion.

20. A fuel rail assembly as set forth in claim 19 characterized further in that said first cylindrical portion stops short of a distal end segment of the interior of said sleeve thereby leaving that distal end segment uncovered.

* * * * *